United States Patent
Anderson

(10) Patent No.: US 9,423,050 B2
(45) Date of Patent: Aug. 23, 2016

(54) INTELLIGENT ACTUATOR AND METHOD OF MONITORING ACTUATOR HEALTH AND INTEGRITY

(71) Applicant: FISHER CONTROLS INTERNATIONAL LLC, Marshalltown, IA (US)

(72) Inventor: Shawn W. Anderson, Haverhill, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 602 days.

(21) Appl. No.: 13/858,986

(22) Filed: Apr. 9, 2013

(65) Prior Publication Data

US 2014/0303793 A1    Oct. 9, 2014

(51) Int. Cl.
F16K 37/00    (2006.01)
F16K 31/126    (2006.01)

(52) U.S. Cl.
CPC ....... *F16K 37/0083* (2013.01); *F16K 31/1262* (2013.01)

(58) Field of Classification Search
None
See application file for complete search history.

(56) References Cited

U.S. PATENT DOCUMENTS

| | | | | |
|---|---|---|---|---|
| 4,879,901 A * | 11/1989 | Leon | ................. | G01B 7/16 700/282 |
| 4,896,101 A * | 1/1990 | Cobb | ................. | F16K 37/0083 324/73.1 |
| 5,251,148 A * | 10/1993 | Haines | ................. | G05D 7/0635 137/487.5 |
| 5,329,465 A * | 7/1994 | Arcella | ................. | G07C 3/00 137/554 |
| 5,433,245 A * | 7/1995 | Prather | ................. | F16K 37/0083 137/554 |
| 5,524,484 A * | 6/1996 | Sullivan | ................. | F16K 37/0083 73/168 |
| 5,549,137 A * | 8/1996 | Lenz | ................. | G05D 7/005 137/486 |
| 5,616,829 A * | 4/1997 | Balaschak | ................. | F16K 31/046 137/551 |
| 6,056,008 A * | 5/2000 | Adams | ................. | G05D 16/2093 137/487.5 |
| 7,516,043 B2 * | 4/2009 | Junk | ................. | G05B 19/0428 701/31.4 |

(Continued)

FOREIGN PATENT DOCUMENTS

DE    199 47 129 A1    4/2001
EP    0315391 A2    5/1989

(Continued)

OTHER PUBLICATIONS

International Search Report and Written Opinion for International Application PCT/US204/033258, dated May 19, 2015.

(Continued)

*Primary Examiner* — Christopher E Everett
(74) *Attorney, Agent, or Firm* — Marshall, Gerstein & Borun LLP

(57) ABSTRACT

An intelligent actuator for a control valve includes an actuator body, an actuator rod, a biasing device, a controller, and at least one sensor. The actuator body includes an actuator casing defining a cavity. The actuator rod is adapted to be coupled to a control element of a control valve. The biasing device is disposed in the cavity of the actuator housing and operably coupled to the actuator rod for biasing the actuator rod into a predetermined position. The controller is carried by the actuator body and includes a memory, a processor, and logic stored on the memory. The at least one sensor is operably coupled to the controller for measuring various parameters of the actuator and transmitting those parameters to the controller. The at least one sensor can include one or more vibration sensors, one or more acoustic sensors, one or more temperature sensors, etc.

25 Claims, 6 Drawing Sheets

(56) References Cited

U.S. PATENT DOCUMENTS

| | | | | |
|---|---|---|---|---|
| 7,636,613 | B2* | 12/2009 | Borah | G05B 9/02 700/27 |
| 7,940,189 | B2* | 5/2011 | Brown | F16K 37/0075 340/605 |
| 7,953,501 | B2* | 5/2011 | Zielinski | G05B 19/4185 700/18 |
| 8,768,631 | B2* | 7/2014 | Wilke | F16K 37/0091 702/35 |
| 2003/0019297 | A1* | 1/2003 | Fiebelkorn | F16K 37/0083 73/587 |
| 2005/0092079 | A1* | 5/2005 | Ales | F16K 7/14 73/270 |
| 2005/0126639 | A1* | 6/2005 | Ens | F16K 37/0083 137/554 |
| 2005/0257618 | A1* | 11/2005 | Boken | G01N 29/14 73/587 |
| 2008/0121290 | A1* | 5/2008 | Pape | F15B 19/005 137/551 |
| 2008/0202606 | A1* | 8/2008 | O'Hara | F16K 37/0083 137/551 |
| 2011/0001070 | A1* | 1/2011 | Wilke | F16K 31/1262 251/129.03 |
| 2012/0274333 | A1 | 11/2012 | Anderson | |
| 2012/0274334 | A1 | 11/2012 | Anderson | |
| 2013/0019683 | A1 | 1/2013 | Carder et al. | |
| 2014/0005960 | A1* | 1/2014 | Anderson | G05B 23/0235 702/56 |

FOREIGN PATENT DOCUMENTS

| | | |
|---|---|---|
| EP | 0390224 A2 | 10/1990 |
| EP | 0462432 A2 | 12/1991 |
| EP | 0 637 713 A1 | 2/1995 |
| WO | WO-95/06276 A1 | 3/1995 |

OTHER PUBLICATIONS

International Preliminary Report on Patentability and Written Opinion for International Application PCT/US204/033258, dated Oct. 22, 2015.

* cited by examiner

INTELLIGENT ACTUATOR AND METHOD OF MONITORING ACTUATOR HEALTH AND INTEGRITY

FIELD OF THE DISCLOSURE

The present disclosure is directed to process control systems and, more particularly, field devices such as control valve actuators used in process control systems.

BACKGROUND

Process control systems, such as distributed or scalable process control systems like those used in chemical, petroleum or other processes, typically include one or more process controllers communicatively coupled to at least one host or user workstation and to one or more field devices via analog, digital or combined analog/digital buses. The field devices, which may include, for example, control valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals, which are sent over the buses to the field devices to control the operation of the process. Information from each of the field devices and the controller is typically made available to one or more applications executed by the user workstation to enable an operator to perform any desired function regarding the process, such as viewing the current state of the process, modifying the operation of the process, etc. In the event that a field device fails, the operational state of the entire process control system can be jeopardized.

SUMMARY

One aspect of the present disclosure includes an actuator for a control valve. The actuator can include an actuator body, an actuator rod, a biasing device, a controller, and at least one sensor. The actuator body includes an actuator casing defining a cavity. The actuator rod is adapted to be coupled to a control element of a control valve. The biasing device is disposed in the cavity of the actuator housing and operably coupled to the actuator rod for biasing the actuator rod into a predetermined position. The controller is carried by the actuator body and can include a memory, a processor, and logic stored on the memory. The at least one sensor can be operably coupled to the controller for measuring parameters of the actuator and transmitting the measured parameters to the controller. The at least one sensor can include (a) a vibration sensor carried by the actuator rod for detecting vibrations in the actuator rod, and/or (b) a vibration sensor carried by the actuator body for sensing vibrations in the actuator body.

Another aspect of the present disclosure can include a process control system having one or more user workstations, a process controller, a plurality of field devices. The process controller is communicatively coupled to the one or more user workstations and the plurality of field devices are communicatively coupled to the process controller. At least one of the field devices can include a control valve and an actuator, wherein the actuator includes an actuator body, an actuator rod, a biasing device, a controller, and at least one sensor. The actuator body includes an actuator casing defining a cavity. The actuator rod is operably coupled to a control element of the control valve. The biasing device is disposed in the cavity of the actuator housing and operably coupled to the actuator rod for biasing the actuator rod into a predetermined position. The controller is carried by the actuator body and can include a memory, a processor, and logic stored on the memory. The at least one sensor is operably coupled to the controller for measuring parameters of the actuator and transmitting the measured parameters to the controller. The at least one sensor can include (a) a vibration sensor carried by the actuator rod for detecting vibrations in the actuator rod, and/or (b) a vibration sensor carried by the actuator body for sensing vibrations in the actuator body.

Still another aspect of the present disclosure includes a method of monitoring the operational health and integrity of a control valve actuator. The method can include measuring one or more parameters of the operating environment of the actuator, wherein the one or more parameters include: (a) a temperature in a cavity of an actuator casing of the actuator, (b) vibrations carried by an actuator rod of the actuator, (c) vibrations carried by an actuator body of the actuator, and/or (d) an acoustic emission parameter of the actuator components. The method can also include receiving the one or more parameters at a controller mounted on the actuator and processing the one or more parameters with the controller to determine if the one or more parameters indicate the presence of a predetermined condition. Additionally, the method can include sending a message to a user workstation with the controller when the controller determines that the detected parameters indicate the presence of a predetermined condition, the message indicating the presence of the predetermined condition.

DETAILED DESCRIPTION

The present disclosure is directed to an intelligent actuator for a field device of a process control system such as a control valve assembly, for example, which incorporates one or more sensors for sensing prognostic and/or diagnostic information regarding the health and integrity of the actuator. In some versions, in addition to the at least one sensor, the actuator can be equipped with an on-board controller for processing data obtained from the sensor(s). So configured, when the controller determines that the sensed data is indicative of a condition that may compromise the health and/or integrity of the actuator, the controller can send a message to a user workstation accessible to maintenance staff or other system personnel, for example. The message can include a variety of pieces of information including, for example, an identification of the actuator and its location, information representing the data obtained from the sensor(s), information regarding the health and/or integrity of a specific component of the actuator, a prediction of an estimated remaining useful life of a component or the actuator as a whole, information instructing the maintenance personnel to perform a specific maintenance task on the actuator, and/or any other desirable information that may be derived through data obtained from the sensor(s). Accordingly, the intelligent actuator and related systems of the present disclosure can advantageously provide real-time information related to the health and integrity of the actuator, as well as facilitate the prediction of remaining useful life and planned maintenance events well before failure occurs. Such predictive capabilities can help prevent unplanned shutdowns associated with unexpected maintenance events, which can be costly and disruptive to the entire process control environment.

Figure 1:
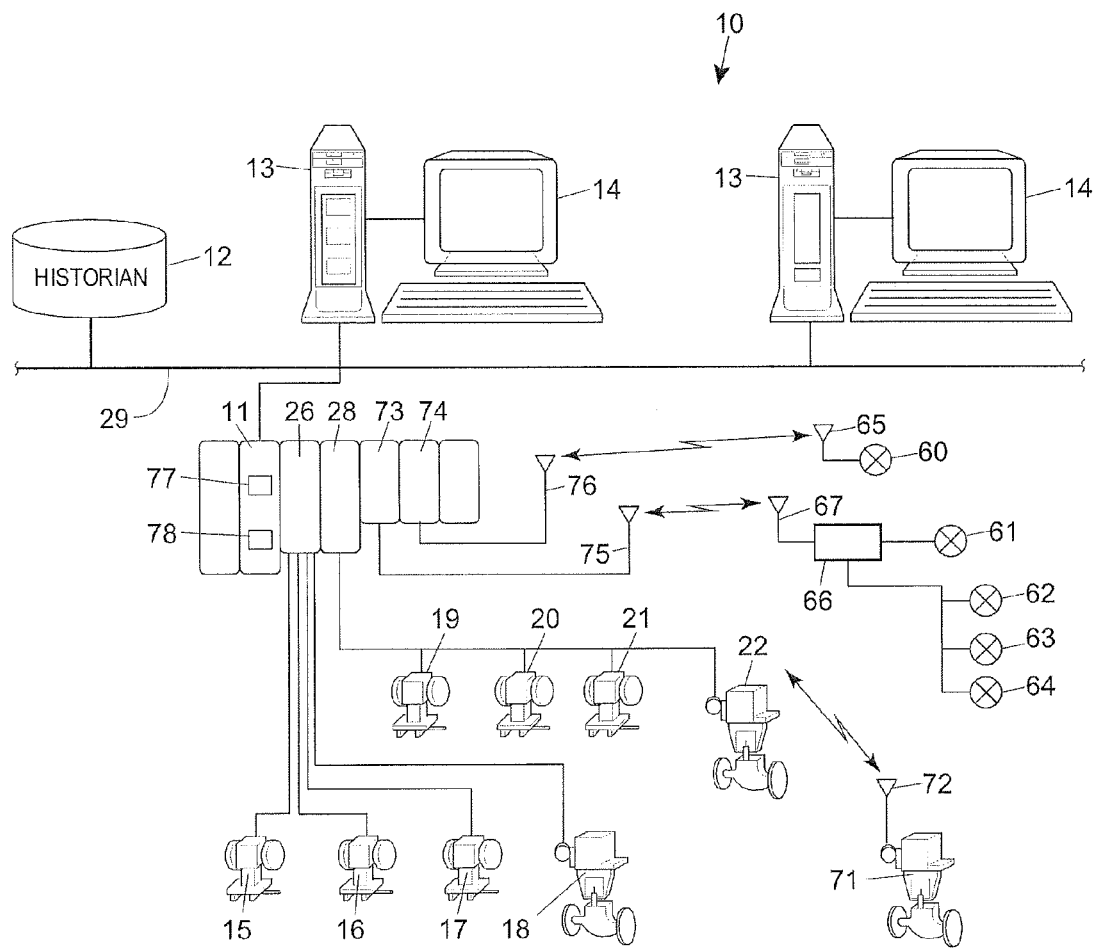
FIG. 1 is a schematic representation of a process control system having one or more intelligent actuators constructed in accordance with the principles of the present disclosure.

Referring now to FIG. 1, a process control system 10 constructed in accordance with one version of the present disclosure is depicted incorporating one or more field devices 15, 16, 17, 18, 19, 20, 21, 22, and 71 in communication with a process controller 11, which in turn, is in communication with a data historian 12 and one or more user workstations 13, each having a display screen 14. So configured, the controller 11 delivers signals to and receives signals from the field devices 15, 16, 17, 18, 19, 20, 21, 22, and 71 and the workstations 13 to control the process control system.

In additional detail, the process controller 11 of the process control system 10 of the version depicted in FIG. 1 is connected via hardwired communication connections to field devices 15, 16, 17, 18, 19, 20, 21, and 22 via input/output (I/O) cards 26 and 28. The data historian 12 may be any desired type of data collection unit having any desired type of memory and any desired or known software, hardware or firmware for storing data. Moreover, while the data historian 12 is illustrated as a separate device in FIG. 1, it may instead or in addition be part of one of the workstations 13 or another computer device, such as a server. The controller 11, which may be, by way of example, a DeltaV™ controller sold by Emerson Process Management, is communicatively connected to the workstations 13 and to the data historian 12 via a communication network 29 which may be, for example, an Ethernet connection.

As mentioned, the controller 11 is illustrated as being communicatively connected to the field devices 15, 16, 17, 18, 19, 20, 21, and 22 using a hardwired communication scheme which may include the use of any desired hardware, software and/or firmware to implement hardwired communications, including, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, and 22 may be any types of devices, such as sensors, control valve assemblies, transmitters, positioners, etc., while the I/O cards 26 and 28 may be any types of I/O devices conforming to any desired communication or controller protocol. In the embodiment illustrated in FIG. 1, the field devices 15, 16, 17, 18 are standard 4-20 mA devices that communicate over analog lines to the I/O card 26, while the digital field devices 19, 20, 21, 22 can be smart devices, such as HART® communicating devices and Fieldbus field devices, that communicate over a digital bus to the I/O card 28 using Fieldbus protocol communications. Of course, the field devices 15, 16, 17, 18, 19, 20, 21, and 22 may conform to any other desired standard(s) or protocols, including any standards or protocols developed in the future.

In addition, the process control system 10 depicted in FIG. 1 includes a number of wireless field devices 60, 61, 62, 63, 64 and 71 disposed in the plant to be controlled. The field devices 60, 61, 62, 63, 64 are depicted as transmitters (e.g., process variable sensors) while the field device 71 is depicted as a control valve assembly including, for example, a control valve and an actuator. Wireless communications may be established between the controller 11 and the field devices 60, 61, 62, 63, 64 and 71 using any desired wireless communication equipment, including hardware, software, firmware, or any combination thereof now known or later developed. In the version illustrated in FIG. 1, an antenna 65 is coupled to and is dedicated to perform wireless communications for the transmitter 60, while a wireless router or other module 66 having an antenna 67 is coupled to collectively handle wireless communications for the transmitters 61, 62, 63, and 64. Likewise, an antenna 72 is coupled to the control valve assembly 71 to perform wireless communications for the control valve assembly 71. The field devices or associated hardware 60, 61, 62, 63, 64, 66 and 71 may implement protocol stack operations used by an appropriate wireless communication protocol to receive, decode, route, encode and send wireless signals via the antennas 65, 67 and 72 to implement wireless communications between the process controller 11 and the transmitters 60, 61, 62, 63, 64 and the control valve assembly 71.

If desired, the transmitters 60, 61, 62, 63, 64 can constitute the sole link between various process sensors (transmitters) and the process controller 11 and, as such, are relied upon to send accurate signals to the controller 11 to ensure that process performance is not compromised. The transmitters 60, 61, 62, 63, 64, often referred to as process variable transmitters (PVTs), therefore may play a significant role in the control of the overall control process. Additionally, the control valve assembly 71 may provide measurements made by sensors within the control valve assembly 71 or may provide other data generated by or computed by the control valve assembly 71 to the controller 11 as part of its operation. Of course, as is known, the control valve assembly 71 may also receive control signals from the controller 11 to effect physical parameters, e.g., flow, within the overall process.

The process controller 11 is coupled to one or more I/O devices 73 and 74, each connected to a respective antenna 75 and 76, and these I/O devices and antennas 73, 74, 75, 76 operate as transmitters/receivers to perform wireless communications with the wireless field devices 61, 62, 63, 64 and 71 via one or more wireless communication networks. The wireless communications between the field devices (e.g., the transmitters 60, 61, 62, 63, 64 and the control valve assembly 71) may be performed using one or more known wireless communication protocols, such as the WirelessHART® protocol, the Ember protocol, a WiFi protocol, an IEEE wireless standard, etc. Still further, the I/O devices 73 and 74 may implement protocol stack operations used by these communication protocols to receive, decode, route, encode and send wireless signals via the antennas 75 and 76 to implement wireless communications between the controller 11 and the transmitters 60, 61, 62, 63, 64 and the control valve assembly 71.

As illustrated in FIG. 1, the controller 11 conventionally includes a processor 77 that implements or oversees one or more process control routines (or any module, block, or sub-routine thereof) stored in a memory 78. The process control routines stored in the memory 78 may include or be associated with control loops being implemented within the process plant. Generally speaking, and as is generally known, the process controller 11 executes one or more control routines and communicates with the field devices 15, 16, 17, 18, 19, 20, 21, 22, 60, 61, 62, 63, 64, and 71, the user workstations 13 and the data historian 12 to control a process in any desired manner(s). Additionally, any one of the field devices 18, 22, and 71 in FIG. 1, each of which is depicted as a control valve assembly, can include an intelligent control valve actuator constructed in accordance with the principles of the present disclosure for communicating with the process controller 11 in order to facilitate monitoring of the actuator's health and integrity.

Figure 2:
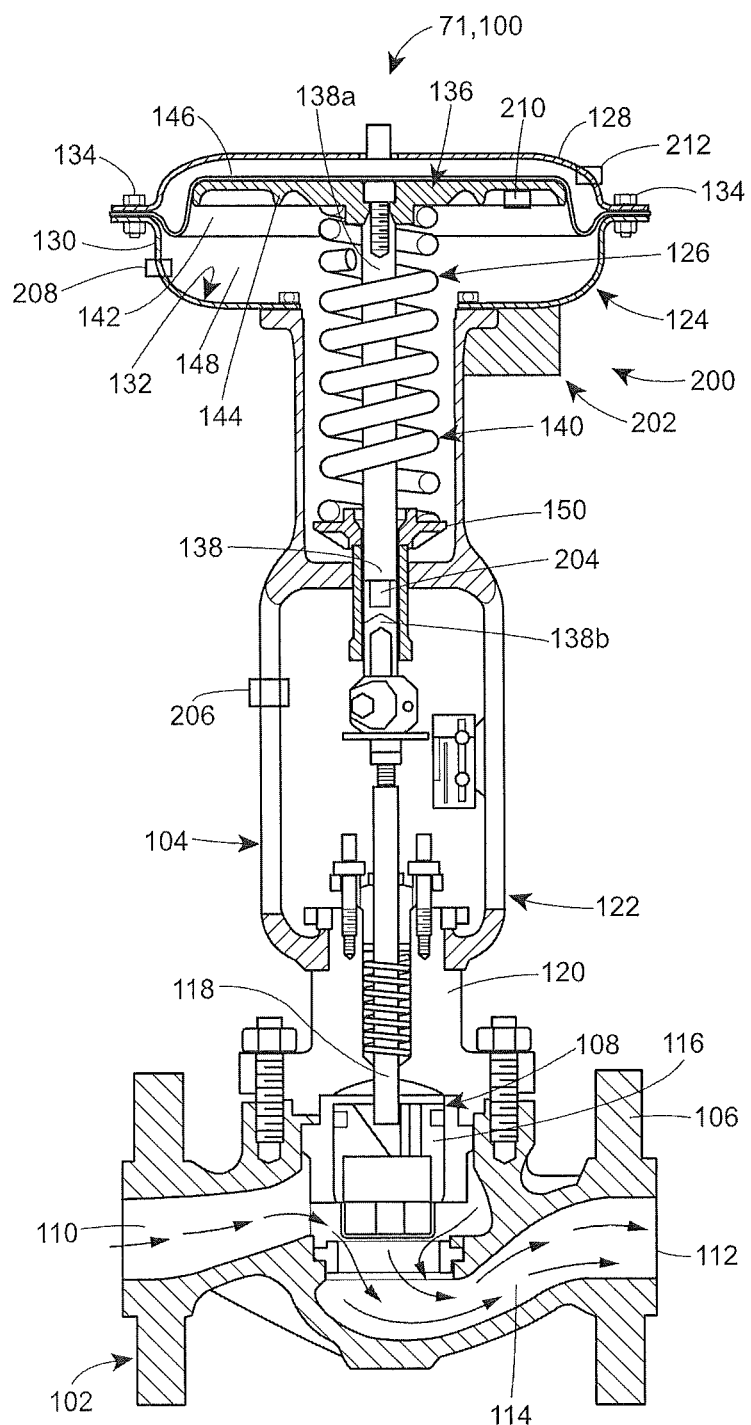
FIG. 2 is a cross-sectional side view of one version of an intelligent actuator constructed in accordance with the principles of the present disclosure coupled to a control valve.

Referring now to FIG. 2, for the sake of description, field device 71 from FIG. 1 is shown as a control valve assembly 100 including a control valve 102 and an intelligent actuator 104 constructed in accordance with the present disclosure. The control valve 102 can include a sliding stem type control valve including a globe-style valve body 106 and a control element 108 disposed for displacement in the valve body 106 for controlling the flow of fluid therethrough. The valve body 106 can define an inlet 110, an outlet 112, and a fluid flow path 114 extending between the inlet 110 and the outlet 112. The control element 108 can include a valve plug 116 connected to a valve stem 118. The valve stem 118 extends out of the valve body 106 through a bonnet 120 for being coupled to the actuator 104 such that the actuator 104 can adjust the position of the control element 108 and, more particularly, the position of the valve plug 116 relative to the flow path 114 to adjust the flow of fluid through the control valve 102.

In FIG. 2, the actuator 104 includes an actuator body 122, an actuator casing 124, and a positioning assembly 126. The actuator body 122 is a generally hollow construct providing guidance, support, and protection to at least a portion of the positioning assembly 126, as shown. The actuator casing 124 includes upper and lower diaphragm casing components 128, 130 fastened together with a plurality of fasteners 134 to define an internal actuator cavity 132. The positioning assembly 126 includes a diaphragm assembly 136, an actuator rod 138, and a biasing device 140. The diaphragm assembly 136 is disposed in the actuator cavity 132 and includes a diaphragm 142 and a diaphragm plate 144. The diaphragm plate 144 is a generally rigid disc-shaped member and the diaphragm 142 includes a conventional membrane-type diaphragm, a central portion of which is in engagement with the diaphragm plate 144. The diaphragm 142 also includes a peripheral portion secured between the upper and lower diaphragm casing components 128, 130 such that the diaphragm 142 divides the actuator cavity 132 into upper and lower sealed cavity portions 146, 148. The actuator rod 138 includes a first end 138a fixed to the diaphragm plate 144 and a second end 138b operably coupled to the valve stem 118 of the control valve 102 via a coupling yoke or some other suitable joint. Finally, the biasing device 140 of the actuator 104 depicted in FIG. 2 includes a compression coil spring disposed between the diaphragm assembly 136 and a spring seat 150 carried by the actuator body 122 at a location below the diaphragm assembly 136. So configured, the biasing device 140 naturally biases the diaphragm assembly 136 in an upward direction relative to the orientation of the actuator 104 in FIG. 2 and away from the spring seat 150. In another configuration, a similar actuator could have this motion reversed when the biasing device tends to hold the valve closed and the pneumatic signal causes the diaphragm assembly to move toward opening the valve trim.

With the control valve assembly 100 of FIG. 2 configured as described, the diaphragm-based actuator 104 serves to position the valve plug 116 of the control valve 102 relative to the flow path 114 to satisfy desired process control parameters. For example, as mentioned, the biasing device 140 of the actuator 104 naturally biases the diaphragm assembly 136 upward relative to the orientation of FIG. 2, which translates into an upward movement of the control element 108 of the control valve 102 toward an open position. In order to move the control element 108 down toward a closed position, a pneumatic signal can be supplied to the upper cavity portion 146 of the actuator cavity 132 to increase the pressure in the upper cavity portion 146. This increase in pressure is sensed by the diaphragm 142 and ultimately overcomes the force applied by the biasing device 140, thereby moving the diaphragm assembly 136, actuator rod 138, and control element 108 in the downward direction. When the pneumatic signal supplied to the upper cavity portion 146 is reduced and/or eliminated, the biasing device 140 can expand and urge the diaphragm assembly 136, actuator rod 138, and control element 108 upward relative to the orientation of FIG. 2.

For each cycle of the actuator 104, as just described, the diaphragm 142 expands, contracts, and deforms under the various pressures and dynamic forces present within the actuator 104. Additionally, depending on the environment in which the actuator 104 is operating, temperature increases, decreases, and/or changes within the actuator cavity 132 can detrimentally affect the integrity of the diaphragm 142. Moreover, the control element 108 of the control valve 102 is also exposed to a variety of dynamic forces present in the fluid flowing through the flow path 114. These forces are transmitted to the actuator rod 138, thereby resulting in various vibratory stresses directly on the actuator rod 138, as well as on the diaphragm assembly 136 including the diaphragm plate 144. These vibrations can indicate wear or damage to the trim components that are internal to the valve body. Further still, throughout the operational life of the control valve assembly 100, the various fluidic pressures flowing through the control valve 102 create vibrations and stresses directly on the control valve body 106, which in turn are transmitted to the bonnet 120, the actuator body 122, and the actuator casing 124. These various vibrations and stresses on the different components of the actuator 104 can ultimately lead to component failure such as, for example, tearing, cracking, and delamination of the diaphragm 142, fracturing or cracking of the diaphragm plate 144, fracturing or cracking of the actuator rod 138, fracturing or cracking of the actuator body 122, and/or fracturing or cracking of the actuator casing 124. Any of these failures can require the entire process control system to be shutdown in order to perform maintenance on the damaged device, which is costly and time-consuming.

To monitor for these potential failures, the intelligent actuator 104 of the control valve assembly 100 in FIG. 2 includes a smart monitoring system 200. The smart monitoring system 200 includes a controller 202, which can be disposed on-board the actuator 104 or remote from the actuator 104, and one or more of the following sensors: (a) a first vibration sensor 204 mounted on the actuator rod 138, (b) a second vibration sensor 206 mounted on the actuator body 122 preferably near the actuator center of gravity (CG), (c) a temperature sensor 208 mounted on the actuator casing 124 to detect temperatures in the actuator cavity 132, (d) a first acoustic emission 210 sensor mounted on the diaphragm plate 144, and/or (e) a second acoustic emission sensor 212 mounted on the actuator casing 124 at a location adjacent to the diaphragm 142 or integral in the diaphragm itself. In some versions, the one or more sensors 204, 206, 208, 210, 212 can communicate with the controller 202 via a wireless communication protocol or via a wired communication line. In some versions, each of the vibration sensors 204, 206 can include an accelerometer such as a PCB model 353B15 accelerometer, which is commercially available from PCB Piezotronics, Inc. In some versions, the temperature sensor 208 can include an RTD or K-type thermocouple made by Fluke Corporation. In some versions, the acoustic emission sensors 210, 212 can include model VS150-RIC sensors, made by Vallen Systeme GmbH. In some versions, other sensors can also be used for any of the foregoing.

As mentioned, the depicted version of the actuator 104 in FIG. 2 includes each of the foregoing sensors 204, 206, 208, 210, 212, but this is by way of example only. An intelligent actuator 104 constructed in accordance with the principles of the present disclosure can include any one or more of the sensors 204, 206, 208, 210, 212 in any variety of combinations. Moreover, other versions of the intelligent actuator 104 constructed in accordance with the principles of the present disclosure can also include additional sensors beyond those specifically mentioned herein. For example, in another version, the smart monitoring system 200 of the actuator 104 may include one or more pressure sensors for monitoring fluid pressure in the actuator casing 124, one or more strain gauges mounted on any one or more of the actuator rod 138, biasing device 140, diaphragm 142, diaphragm plate 144, and actuator body, for example, or any other type of sensor that might be capable of obtaining meaningful information regarding the health and/or integrity of any one or more components of the actuator 104 within the scope and objectives of the present disclosure.

Figure 3:
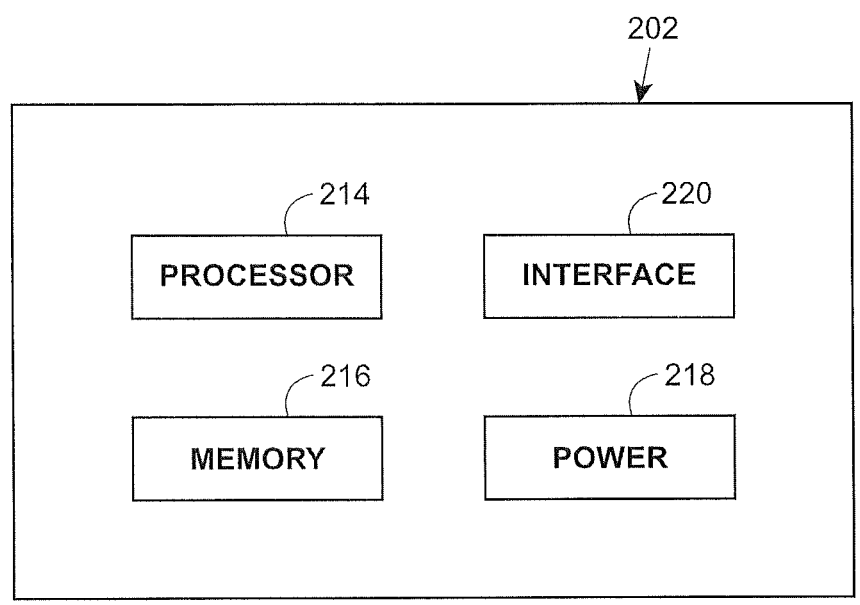
FIG. 3 is a schematic block diagram of one version of a controller of the intelligent actuator of FIG. 2.

Referring to FIG. 3, the controller 202 of the presently disclosed intelligent actuator 104 is schematically illustrated as a block diagram. The controller 202 can include a processor 214, a memory 216, a power source 218, and a communication interface 220. The processor 214 can include a conventional central processing unit (CPU) including an electronic circuit capable of executing computer programs and related logic. The memory 216 can include a conventional electronic storage device including RAM and/or ROM for operation in conjunction with the processor 214 for effecting desired processing on-board the intelligent actuator 104. The power source 218, in one version, can include a battery, for example, such that the controller 202 and the entire smart monitoring system 200 are independently powered. In other versions, where available, for example, the power source 218 may not include a battery power, but rather, can include a hard wired electrical line. In yet other versions, the power source 218 could include a fuel cell, a solar panel, a wind turbine, or any other device capable of generating and/or supplying power to the controller 202 and other components of the smart monitoring system 200. The communication interface 220 can include a wireless interface such as a wireless antenna, a wired interface such as a network port, or any other type of interface capable of communicating with the one or more sensors 204, 206, 208, 210, 212 of the intelligent actuator 104 and also with the process controller 11 of the overall process control system 10 discussed above with reference to FIG. 1, for example.

With the controller 202 configured as described, the communication interface 220 can obtain information regarding the various environmental conditions of the actuator 104 directly from the one or more sensors 204, 206, 208, 210, 212. The processor 214 can process that information directly on-board the intelligent actuator 104 to determine the current state of the health and integrity of the actuator 104. And, based on the result of that processing, the controller 202 can then communicate with the process controller 11 in an appropriate manner depending on the specific application.

Figure 4:
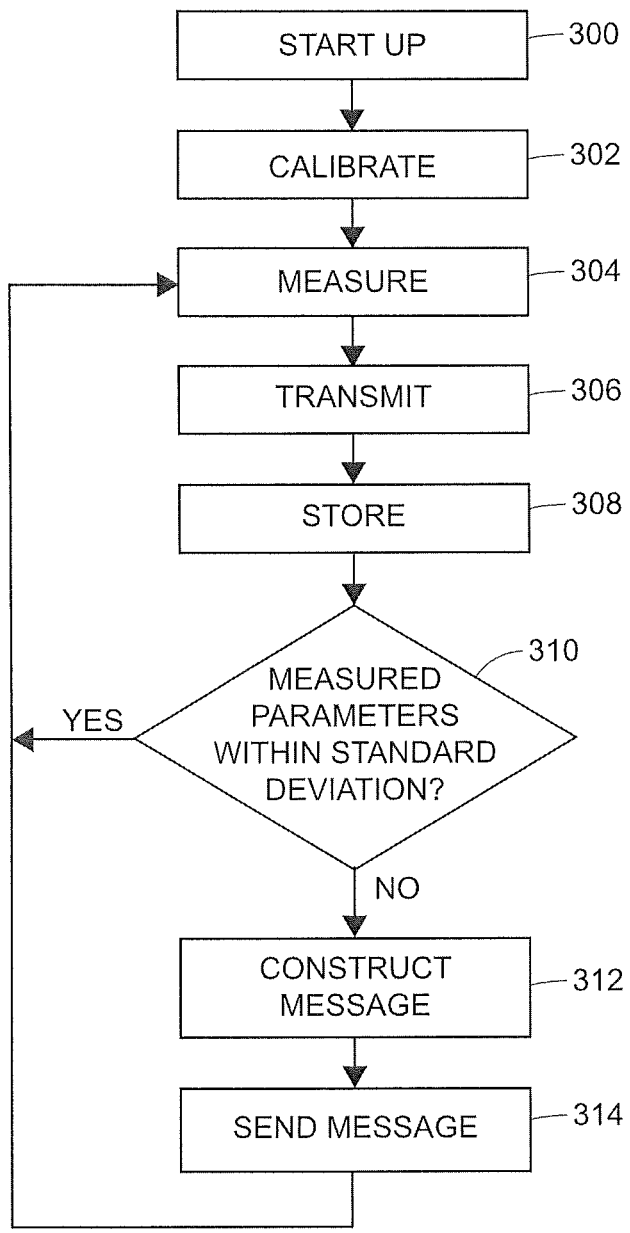
FIG. 4 is a flow chart of one version of a method of monitoring the operational health and integrity of a control valve actuator in accordance with the principles of the present disclosure.

For example, with reference now to FIG. 4, one example of a processing method conducted in accordance with the principles of the present disclosure will be described. Block 300 in FIG. 4 represents start-up, upon which the intelligent actuator 104 of the present disclosure is initially powered on after being installed in the field into a process control system environment. Once powered on, the intelligent actuator 104 is calibrated at block 302. During calibration, the intelligent actuator 104 is allowed to operate under the normal operating conditions of the process control system for a predetermined period of time, e.g., 1 hour, 12 hours, 48 hours, etc. During this time, it is assumed that the process control environment is operating under stable conditions and the various components of the actuator 104 are in full health such that the actuator 104 operates without any failure concerns. As the actuator 104 operates, the controller 202 monitors the one or more sensors 204, 206, 208, 210, 212 on the actuator 104 to establish a set of system-normal "operating parameters or a normal range," i.e., one operating parameter or range for each of the included sensors 204, 206, 208, 210, 212. These operating parameters represent the values measured by the one or more sensors 204, 206, 208, 210, 212 during normal healthy operation of the actuator 104 in the specific process control system environment. The operating parameters are then stored in the memory 216 of the controller 202. The operating parameters can be arrived at any number of ways. For example, in one version, the operating parameters can be arrived at by averaging the measurements obtained by each sensor 204, 206, 208, 210, 212 over the duration of the calibration period. In another version, the operating parameters can be arrived at by taking the mean of the measurements obtained by each sensor 204, 206, 208, 210, 212 over the duration of the calibration period or by any other mathematical or other method.

Once the calibration period is complete, the intelligent actuator 104 transitions into normal operating mode. That is, as indicated by blocks 304 and 306 in FIG. 4, the one or more sensors 204, 206, 208, 210, 212 begin taking measured parameters (block 304) in accordance with a pre-established normal operating routine and transmitting those measured parameters (block 306) to the controller 202 for processing. The normal operating routine may include the one or more sensors 204, 206, 208, 210, 212 taking and transmitting measured parameters generally continuously or intermittently (e.g., every 5 minutes, every hour, etc.). In versions of the actuator 104 that rely on a battery as the power source 208, it might be desirable to take and transmit measured parameters intermittently in the interest of preserving battery life, but it certainly would not be required.

Once the measured parameters are transmitted to the controller 202, the controller 202 can store them in the memory, as indicated by block 308. This may include storing the measured parameters in a RAM and/or a ROM, depending on the nature of the process.

Next, as indicated by block 310, the processor 214 of the controller 204 compares the measured parameters to the operating parameters that were previously collected and stored in the memory 216 during calibration at block 302. At block 310, the processor 214 conducts one or more separate comparisons for each of the sensors 204, 206, 208, 210, 212 included within the intelligent actuator 104. For example, with respect to the vibration sensors 204, 206, the processor 214 can compare vibration accelerations, directions, frequencies, durations, magnitudes, etc. With respect to the temperature sensor 208, the processor 214 can compare temperature magnitudes, durations, fluctuations, etc. With respect to the acoustic emission sensors 210, 212, the processor 214 can compare acoustic frequencies, amplitudes, durations, energies, etc. Based on these comparisons, the processor 214 determines if each of the measured parameters is within an acceptable standard of deviation relative to the corresponding operating parameter collected during calibration.

If all of the measured parameters are determined to be within the corresponding acceptable standards of deviation, then the process returns to block 304, as indicated in FIG. 4. If, however, one or more of the measured parameters falls outside of the corresponding acceptable standard of deviation, the process proceeds to blocks 312 and 314 in FIG. 4.

At block 312, the processor 214 constructs a message to be sent to the process controller 11 of the process control system 10, based on the processing conducted at block 310. For example, based on the comparisons conducted, the processor 214 can identify the specific sensors 204, 206, 208, 210, 212 that have obtained a measured parameter outside of the acceptable standard of deviation. The processor 214 can identify these one or more sensors 204, 206, 208, 210, 212 as indicating the presence of a predetermined condition, which can be referred to as an "alarm condition," for example. Thus, in some versions, the processor 214 can construct a message at block 312 that includes a listing of the one or more sensors 204, 206, 208, 210, 212 that are reporting the presence of an "alarm condition." Once the message is generated, the processor 214 transmits the message to the process controller 11 via the communication interface 220 at block 314 and may also provide recommended actions based on that alarm. The process controller 11 can then transmit the message to the one or more user workstations 13, where the message can be presented on the display device(s) 14 to be considered by appropriate operating personnel. The operating personnel can then determine the best course of action to take in response to the message received. In some versions, the sending of a message at block 314 does not interrupt the method of FIG. 4 and, thus, the process returns to block 304 for further processing. In other versions, the sending of the message at block 314 can act as a trigger that stops or modifies further processing.

As discussed above, the message generated at block 312 can be relatively simple, i.e., a simple identification of the one or more sensors 204, 206, 208, 210, 212 reporting the presence of an "alarm condition." In other versions, the message can include additional information such as, for example, the actuator name, model number, and/or other identifying information, the actuator location based on GPS information or some other geo-spatial coordinate system, or other information related to the actuator in general. Moreover, in some versions, based on the specific values of the measured parameters, the processor 214 can also include predictive health information in the message. That is, the processor 214 might assign a symbol of degree to each sensor included in the message based on the extent to which the measured parameter is outside of the acceptable standard of deviation. For example, for sensors reporting measured parameters only slightly outside of the corresponding standard of deviation, the message may include a yellow triangle adjacent to the identification of the sensor. And, for sensors reporting measured parameters significantly outside of the standard of deviation, the message may include a red octagon adjacent to the identification of the sensor. As mentioned, other symbols of degree, including terms of degree, are also included within the scope of the present disclosure and the use of colored geometrical shapes is only one possible example. Regardless of how it is presented, this additional piece of information may assist operating personnel in assessing the severity and/or urgency of the detected "alarm condition."

Thus far, the method of FIG. 4 has been described as assessing the health and integrity of the intelligent actuator 104 based on comparisons with operating parameters collected during normal operation of the actuator 104 in the field, i.e., during calibration at block 302. Other versions of the method can also include comparisons with other information.

Figure 5:
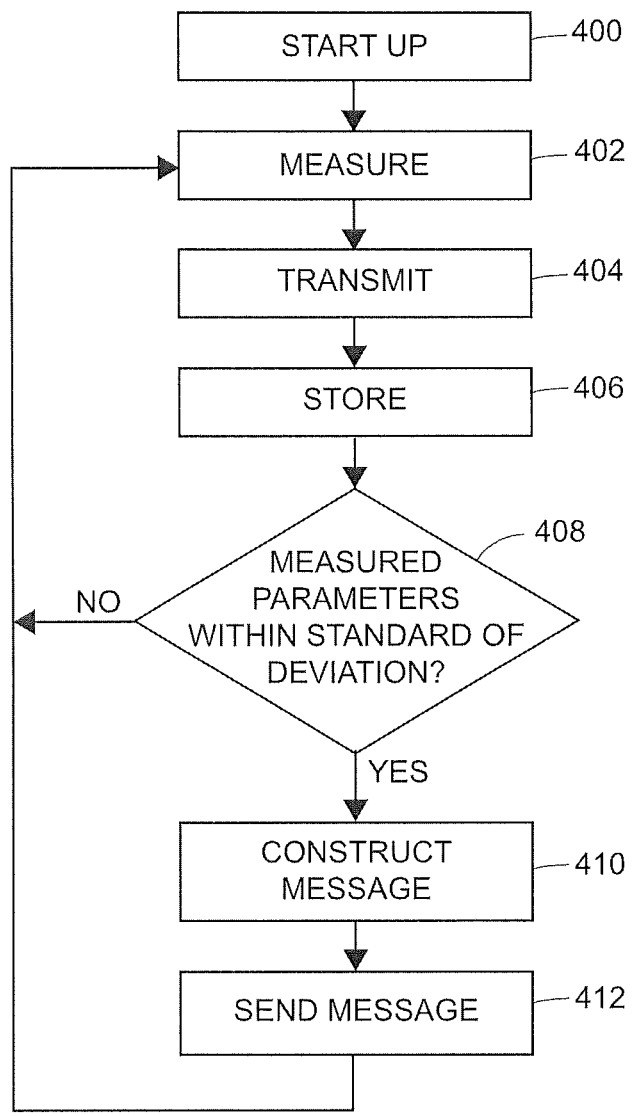
FIG. 5 is a flow chart of another version of a method of monitoring the operational health and integrity of a control valve actuator in accordance with the principles of the present disclosure.

For example, FIG. 5 provides a flow chart of an alternative method of processing based on predetermined "event parameters" that are stored in the memory 216 of the controller 202 prior to field installation, and which indicate the presence of an "alarm condition." Such event parameters can include parameters derived through laboratory testing or historical data analysis, for example, and can be completely independent of the specific field environment in which the actuator 104 will be used. For example, one event parameter might be a specific acoustic frequency that is known to be specifically associated with the sound emitted by the diaphragm 142 of the actuator 104 when the diaphragm 142 experiences tearing. Still another event parameter could be a specific temperature within the actuator cavity 132, at or above which the diaphragm 142 is known to experience significant structural degradation. Yet another event parameter could be a specific magnitude, direction, duration, or frequency of vibration sensed on the actuator rod 138 or actuator body 122, for example, at or above which the actuator rod 138 or actuator body 122 is known to possess a structural abnormality such as a crack or fracture.

Thus, referring to FIG. 5, after the actuator 104 is installed into the process control system 10, it is powered on for start up at block 400. At blocks 402 and 404, the one or more sensors 204, 206, 208, 210, 212 begin collecting measured parameters and transmitting those measured parameters to the controller 202. At block 406, the controller stores the measured parameters in the memory 216. Similar to that described above with respect to the method of FIG. 4, the one or more sensors 204, 206, 208, 210, 212 of the method of FIG. 5 may collect measured parameters either continuously or intermittently as desired for any given process and system requirements. After the measured parameters are transmitted to the controller 202, the processor 214 compares the measured parameters to corresponding event parameters stored in the memory 216 at block 408. If the processor 214 determines that all of the measured parameters fail to match an event parameter, i.e., they are outside of a predetermined standard of deviation relative to the event parameters, the method proceeds back to block 402. If, however, the processor 214 determines that one or more of the measured parameters does match one or more event parameters, i.e., one or more measured parameters is within the predetermined standard of deviation relative to the corresponding event parameter, then the method proceeds to blocks 410 and 412.

At block 410, the processor 214 constructs a message to be sent to the process controller 11 at block 412. Similar to that discussed above with respect to FIG. 4, the message constructed at block 410 can include a variety of information including the name of the actuator 104, the model number, the location, etc. Moreover, the message can include information identifying the one or more sensors that have reported measured parameters matching event parameters. Further still, the message can include information associated with the specifically matched event parameters and provide recommended actions. For example, if the processor 214 determines that one of the acoustic emission sensors 210, 212 has reported a frequency and amplitude that matches a frequency and amplitude associated with the diaphragm tearing or delaminating, then the message can include an indication that the diaphragm may require repair or replacement. Further still, based on the one or more specific event parameters that is matched, the message could also be constructed by the processor 214 to indicate an estimated duration of remaining useful life for the diaphragm 142 or other actuator components based on historical data analysis. For example, through testing in a laboratory, trending data can be collected and stored on the memory 216 of the controller 202, wherein the trending data can be indicative of the acoustic emissions of the diaphragm 142, for example, over time, as the diaphragm 142 initially illustrates signs of tearing or delaminating through catastrophic failure. This trending data could include a range, for example, of steadily increasing or decreasing acoustic measurements emitted by the diaphragm 142. Thus, by monitoring multiple sequential readings from the one or more acoustic emission sensors 210, 212, the processor 214 could determine where in the range of trending data the diaphragm 142 presently resides. Based on the rate at which the readings progress through the range of trending data, the processor 214 could estimate how long the diaphragm 142 can operate before experiencing catastrophic failure.

While the foregoing discussion focused on tailoring the message at block 410 relative to the health and integrity of the diaphragm 142 based on the measurements taking by the one or more acoustic emission sensors 210, 212, this is by way of example only. That is, similar messages including similar information can be constructed for any of the actuator components based on any of the sensor measurements. That is, custom messages regarding remaining useful life and/or specific maintenance operations can be similarly constructed relative to the health and integrity of the diaphragm 142, actuator rod 138, actuator body 122, or any other components based on measurements from the temperature sensor 208 and/or the vibration sensors 204, 206, as well.

Moreover, while the comparison methods of FIGS. 4 and 5 have been described as being performed separately, in another version, these two methods could be combined. That is, the processor 214 of the intelligent actuator 104 of the present disclosure could include the ability to assess health and integrity based on comparisons with normal operating parameters collected in the field, as described with respect to FIG. 4, as well as based on comparisons with predetermined, predefined, event parameters collected from laboratory tests and/or historical data, as described with respect to FIG. 5.

Figure 6:
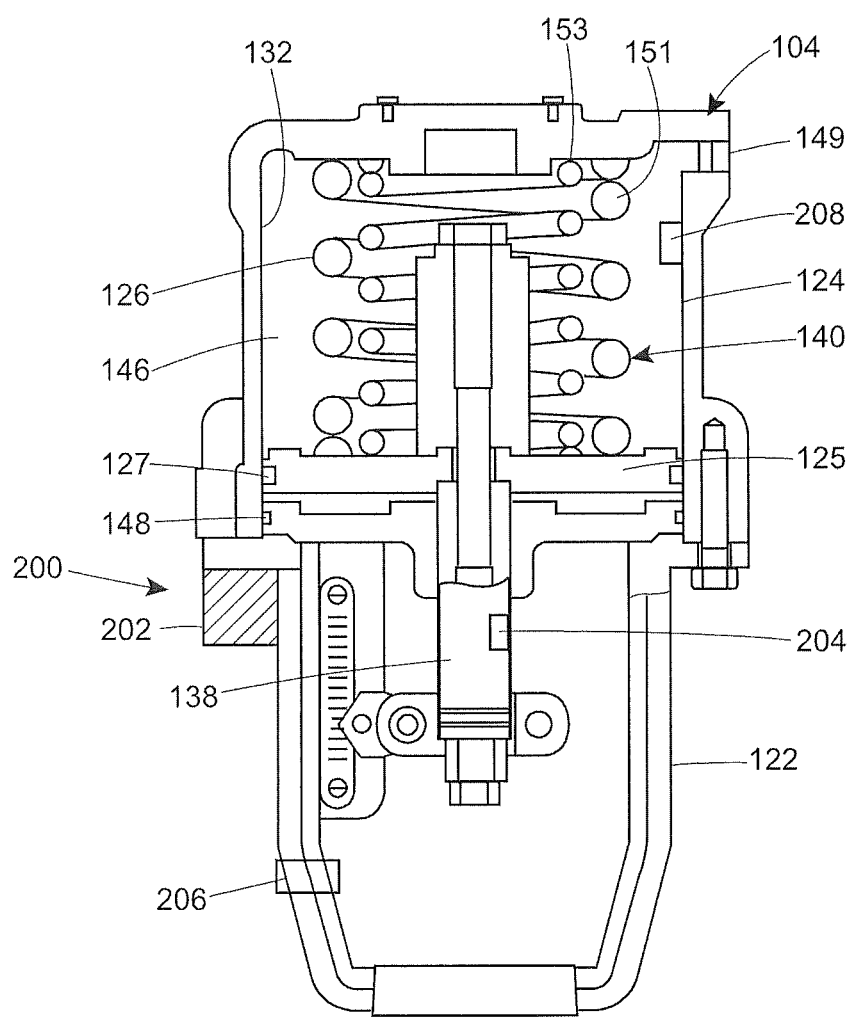
FIG. 6 is a cross-sectional side view of another version of an intelligent actuator constructed in accordance with the principles of the present disclosure.

As described above with respect to FIG. 2, one version of an intelligent actuator 104 of the present disclosure includes a spring and diaphragm actuator assembly 136 for effecting movement of the actuator rod 138 and any coupled control valve stem 118. The present disclosure, however, is not limited to diaphragm-based actuators. For example, FIG. 6 depicts another version of the intelligent actuator 104 of the present disclosure, which includes a pneumatic piston-based actuator. That is, the actuator 104 includes an actuator body 122, an actuator casing 124, a piston assembly 126, an actuator rod 138, and may or may not contain a biasing device 140 such as a coil spring. The actuator casing 124 defines an actuator cavity 132, in which the piston assembly 126 is disposed for effecting movement of the actuator rod 138. Although not shown in FIG. 6, the actuator rod 138 is adapted to be operably coupled to a valve stem of a control valve, such as the control valve depicted in FIG. 2, for example. The piston assembly 126 includes a piston 125 connected to the actuator rod 138. The piston 125 includes a seal member 127 disposed about its perimeter edge and in sealing engagement with an internal wall of the actuator cavity 132, as shown. Thus, the piston 125 divides the actuator cavity 132 into upper and lower cavity portions 146, 148, which are sealed from each other. The biasing device 140 of the version of the actuator 104 of FIG. 6 can include a pair of coil springs 151, 153 disposed in the upper cavity portion 146 of the actuator cavity 132 about the actuator rod 138 and in engagement with a top-side of the piston 125.

So configured, the biasing device 140 biases the piston 125 downward relative to the orientation of FIG. 6. As also depicted, the actuator casing 124 includes a first fluid port 149 through the upper cavity portion 146 of the actuator cavity 132 and, although not shown, the actuator casing 124 can include a second fluid port in the lower cavity portion 148 of the actuator cavity 132. So configured, during operation, fluid can be introduced through the second fluid port and into the lower portion 148 of the actuator cavity 132 to increase the fluid pressure below the piston 125 and force the piston 125 to move against the urging of the biasing device 140. In such a situation, the first fluid port 149 can act as a passive exhaust port such that fluid pressure in the upper cavity portion 146 of the actuator cavity 132 has minimal impact on the operation of the actuator. In the case of a double acting (no spring) piston style actuator, the differential pressure across the piston is controlled to move the stem according to the commanded signal.

Still referring to FIG. 6, the actuator 104 also includes a smart monitoring system 200 similar to that of the actuator 104 of FIG. 2. Specifically, the smart monitoring system 200 of the actuator 104 of FIG. 6 includes a controller 202 and one or more of the following sensors: (a) a vibration sensor 204 carried on the actuator rod 138, (b) a vibration sensor 206 carried on the actuator body 122, and/or (c) a temperature sensor 208 carried by the actuator casing 124 for measuring temperature in the actuator cavity 132. The actuator 104 of FIG. 6 is not depicted as including one or more acoustic emission sensors. Nevertheless, this is just an example, and in another version, the version of the actuator 104 in FIG. 6 could include one or more acoustic emission sensors or other type of sensors for measuring different characteristics of the piston assembly 126 and/or other components. With the actuator of FIG. 6 configured as described, it should be appreciated that the controller 202 can perform any of the methods and procedures described above with respect to FIGS. 4 and 5 in order to monitor, assess, and report on the health and integrity of the overall actuator 104. Thus, those methods need not be repeated.

Based on the foregoing, it should be appreciated that the present disclosure provides unique devices, systems, and methods for monitoring the health and integrity of process control system field devices including specifically control valve actuators similar to the different versions of the actuator 104 disclosed herein. So configured, control system operating personnel can receive real-time information regarding the health and integrity of actuators, which can then be used to plan and execute maintenance operations and related tasks in a strategic manner to reduce down time, cost, and the number of occurrences of critical component failure.

What is claimed is:

1. An actuator for a control valve, the actuator comprising:
   an actuator body including an actuator casing defining a cavity;
   an actuator rod adapted to be coupled to a control element of a control valve;
   a biasing device disposed in the cavity of the actuator casing and operably coupled to the actuator rod for biasing the actuator rod into a predetermined position;
   a controller carried by the actuator body and including a memory, a processor, and logic stored on the memory;
   at least one sensor operably coupled to the controller for measuring parameters of the actuator and transmitting measured parameters to the controller, the at least one sensor comprising a vibration sensor mounted to the actuator rod for detecting vibrations in the actuator rod.

2. The actuator of claim 1, wherein the at least one sensor further comprises (a) a temperature sensor carried by the actuator casing for detecting a temperature in the actuator cavity, and/or (b) a vibration sensor carried by the actuator body for sensing vibrations in the actuator body.

3. The actuator of claim 1, further comprising a diaphragm assembly disposed in the actuator cavity and operably coupled between the actuator rod and the biasing device for moving the actuator rod in response to pressure changes in the actuator cavity.

4. The actuator of claim 3, wherein the at least one sensor further comprises one or more acoustic emission sensors mounted on or adjacent to the diaphragm assembly.

5. The actuator of claim 4, wherein the diaphragm assembly comprises a diaphragm and a diaphragm plate and wherein the one or more acoustic emission sensors comprises a first acoustic emission sensor attached to the diaphragm or integral to the diaphragm and/or a second acoustic emission sensor attached to the diaphragm plate.

6. The actuator of claim 1, wherein the logic stored on the memory of the controller is executable by the processor for:
   receiving measured parameters from the at least one sensor;
   processing the measured parameters to determine if one or more of the measured parameters is indicative of a predetermined condition; and
   sending a message to a workstation when one or more of the measured parameters is indicative of a predetermined condition, the message indicating the presence of the predetermined condition.

7. The actuator of claim 6, wherein sending a message to a workstation comprises sending a message that identifies a specific maintenance operation to be performed on the actuator.

8. The actuator of claim 6, wherein sending a message to the workstation comprises sending a message that identifies an estimated duration of remaining useful life for one or more specific components of the actuator.

9. A process control system, comprising:
   one or more user workstations;
   a process controller communicatively coupled to the one or more user workstations; and
   a plurality of field devices communicatively coupled to the process controller, at least one of the plurality of field devices comprising a control valve and an actuator, the actuator comprising:
   an actuator body including an actuator casing defining a cavity,
   an actuator rod operably coupled to a control element of the control valve,
   a biasing device disposed in the cavity of the actuator casing and operably coupled to the actuator rod for biasing the actuator rod into a predetermined position,
   a controller carried by the actuator body and including a memory, a processor, and logic stored on the memory, and
   at least one sensor operably coupled to the controller for measuring parameters of the actuator and transmitting measured parameters to the controller, the at least one sensor comprising a vibration sensor mounted to the actuator rod for detecting vibrations in the actuator rod.

10. The system of claim 9, wherein the at least one sensor further comprises a (a) temperature sensor carried by the actuator casing for detecting a temperature in the actuator cavity, and/or (b) a vibration sensor carried by the actuator body for sensing vibrations in the actuator body.

11. The system of claim 9, further comprising a diaphragm assembly disposed in the actuator cavity and operably coupled between the actuator rod and the biasing device for moving the actuator rod in response to changes in pressure in the cavity.

12. The system of claim 11, wherein the at least one sensor further comprises one or more acoustic emission sensors mounted on or adjacent to the diaphragm assembly.

13. The system of claim 12, wherein the diaphragm assembly comprises a diaphragm and a diaphragm plate and wherein the one or more acoustic emission sensors comprises a first acoustic emission sensor attached to the diaphragm or integral to the diaphragm and/or a second acoustic emission sensor attached to the diaphragm plate.

14. The system of claim 9, wherein the logic stored on the memory of the controller is executable by the processor for:
   Receiving the measured parameters from the at least one sensor;
   processing the measured parameters to determine if one or more of the measured parameters is indicative of a predetermined condition; and
   sending a message to the one or more workstations when one or more of the measured parameters is indicative of a predetermined condition, the message indicating the presence of the predetermined condition.

15. The system claim 14, wherein sending a message to the one or more workstations comprises sending a message that identifies a specific maintenance operation to be performed on the actuator.

16. The system of claim 14, wherein sending a message to the one or more workstations comprises sending a message that identifies an estimated duration of remaining useful life for one or more specific components of the actuator.

17. The system of claim 9, wherein the one or more workstations comprises one or more of the following devices: a personal computer, a laptop computer, a tablet, a smart-phone, and a pager.

18. A method of monitoring the operational health and integrity of a control valve actuator, the method comprising:
   measuring one or more parameters of an operating environment of the actuator, the one or more parameters comprising vibrations carried by an actuator rod of the actuator measured by a vibration sensor mounted to the actuator rod, and at least: (a) a temperature in a cavity of an actuator casing of the actuator, (b) vibrations carried by an actuator body of the actuator, and/or (c) an acoustic emission parameter of the actuator;

receiving the one or more parameters at a controller mounted on the actuator;

processing the one or more parameters with the controller to determine if the one or more parameters indicate the presence of a predetermined condition; and sending a message to a user workstation with the controller when the controller determines that the detected parameters indicate the presence of a predetermined condition, the message indicating the presence of the predetermined condition.

19. The method of claim 18, wherein processing the one or more measured parameters comprises comparing the one or more parameters to one or more corresponding operating parameters stored on a memory of the controller.

20. The method of claim 19, wherein the controller sends the message to the user workstation when the one or more parameters are outside of an accepted standard of deviation from the operating parameters.

21. The method of claim 19, further comprising calibrating the controller upon start up of the actuator by collecting and storing the one or more operating parameters.

22. The method of claim 18, wherein processing the one or more measured parameters comprises comparing the one or more measured parameters to one or more corresponding event parameters stored on a memory of the controller.

23. The method of claim 22, wherein the controller sends the message to the user workstation when the one or more measured parameters match the one or more corresponding event parameters.

24. The method of claim 18, wherein sending a message to the user workstation comprises sending a message that identifies a specific maintenance operation to be performed on the actuator.

25. The system of claim 18, wherein sending a message to a workstation comprises sending a message that identifies an estimated duration of remaining useful life for one or more specific components of the actuator.

\* \* \* \* \*